US010867712B2

(12) United States Patent
Hunt et al.

(10) Patent No.: US 10,867,712 B2
(45) Date of Patent: Dec. 15, 2020

(54) ISOLATION CONDENSER SYSTEMS FOR NUCLEAR REACTOR COMMERCIAL ELECTRICITY GENERATION

(71) Applicant: GE-Hitachi Nuclear Energy Americas LLC, Wilmington, NC (US)

(72) Inventors: Brian S. Hunt, Wilmington, NC (US); Christer N. Dahlgren, Wilmington, NC (US); Wayne Marquino, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 509 days.

(21) Appl. No.: 15/635,400

(22) Filed: Jun. 28, 2017

(65) Prior Publication Data

US 2019/0006052 A1 Jan. 3, 2019

(51) Int. Cl.
*G21C 15/16* (2006.01)
*G21C 15/02* (2006.01)
(Continued)

(52) U.S. Cl.
CPC ............. *G21C 15/16* (2013.01); *G21C 15/02* (2013.01); *G21C 15/18* (2013.01); *G21C 15/26* (2013.01); *G21C 17/035* (2013.01); *G21C 9/04* (2013.01)

(58) Field of Classification Search
CPC ........ G21C 15/16; G21C 15/02; G21C 15/18; G21C 15/26; G21C 17/035; G21C 9/04
(Continued)

(56) References Cited

U.S. PATENT DOCUMENTS 4,889,682 A    12/1989   Gou et al.
4,948,554 A *   8/1990   Gou ........................ G21C 15/18
                                              376/283
(Continued)

FOREIGN PATENT DOCUMENTS

KR     1020140037825     3/2011

OTHER PUBLICATIONS

Oka, "Implications and Lessons for Advanced Reactor Design and Operation", In Reflections on the Fukushima Daiichi Nuclear Accident, pp. 223-258. Springer, Cham, 2015. (Year: 2015).*
(Continued)

*Primary Examiner* — Jack W Keith
*Assistant Examiner* — Daniel Wasil
(74) *Attorney, Agent, or Firm* — Ryan Alley IP (57) ABSTRACT

Nuclear reactors include isolation condenser systems that can be selectively connected with the reactor to provide desired cooling and pressure relief. Isolation condensers are immersed in a separate chamber holding coolant to which the condenser can transfer heat from the nuclear reactor. The chamber may selectively connect to an adjacent coolant reservoir for multiple isolation condensers. A check valve may permit coolant to flow only from the reservoir to the isolation condenser. A passive switch can operate the check valve and other isolating components. Isolation condensers can be activated by opening an inlet and outlet to/from the reactor for coolant flow. Fluidic controls and/or a pressure pulse transmitter may monitor reactor conditions and selectively activate individual isolation condensers by opening such flows. Isolation condenser systems may be positioned outside of containment in an underground silo with the containment, which may not have any other coolant source.

9 Claims, 4 Drawing Sheets

(51) Int. Cl.
*G21C 15/18* (2006.01)
*G21C 15/26* (2006.01)
*G21C 17/035* (2006.01)
*G21C 9/04* (2006.01)

(58) Field of Classification Search
USPC .............. 376/277, 282, 283, 352, 378, 402
See application file for complete search history.

(56) References Cited

U.S. PATENT DOCUMENTS

| | | | |
|---|---|---|---|
| 5,059,385 A | 10/1991 | Gluntz et al. | |
| 5,106,571 A * | 4/1992 | Wade ................ | G21C 15/18 376/283 |
| 5,126,099 A | 6/1992 | van Kuijk | |
| 5,282,230 A | 1/1994 | Billig et al. | |
| 5,761,262 A | 6/1998 | No et al. | |
| 2007/0092053 A1 | 4/2007 | Sato | |
| 2008/0317193 A1 | 12/2008 | Sato | |
| 2012/0243651 A1 | 9/2012 | Malloy | |
| 2013/0156143 A1 | 6/2013 | Bingham | |
| 2016/0027535 A1 * | 1/2016 | Kanuch ............... | G21C 15/18 376/282 |
| 2016/0196885 A1 | 7/2016 | Singh et al. | |

OTHER PUBLICATIONS

Bruce. "Removing heat from a reactor in shutdown", Mechanical Engineering—CIME 133, No. 5 (2011): 34-36. (Year: 2011).*
Rogers, "Underground Nuclear Power Plants", Bulletin of the Atomic Scientists 27, No. 8 (1971): 38-51. (Year: 1971).*
GE-Hitachi Nuclear Energy, "The ESBWR Plant General Description" Jun. 1, 2011.
CCI, "CCI Nuclear Valve Resource Guide for Power Uprate and Productivity Gains" 2003.
NuScale Power, "NuScale Module Small-Break Loss-of-Coolant Accident Phenomena Identification and Ranking Table" Jan. 2013.
Areva, "Passive Pressure Pulse Transmitter" 2014.
MPower, "B&W mPowerTM Integral Isolation Valve Technical Report" Nov. 11, 2013.
GE-Hitachi Nuclear Energy, "ABWR COPS Redesign—ABWR DCD Revision 6 Markups" (available at https://www.nrc.gov/docs/ML1616/ML16168A304.pdf) (retrieved Jun. 28, 2017).
WIPO, International Search Report in Corresponding PCT Application PCT/US2018/036894, dated Oct. 2, 2018.
WIPO, Written Opinion in Corresponding PCT Application PCT/US2018/036894, dated Oct. 2, 2018.

* cited by examiner

ISOLATION CONDENSER SYSTEMS FOR NUCLEAR REACTOR COMMERCIAL ELECTRICITY GENERATION

BACKGROUND

Figure 1:
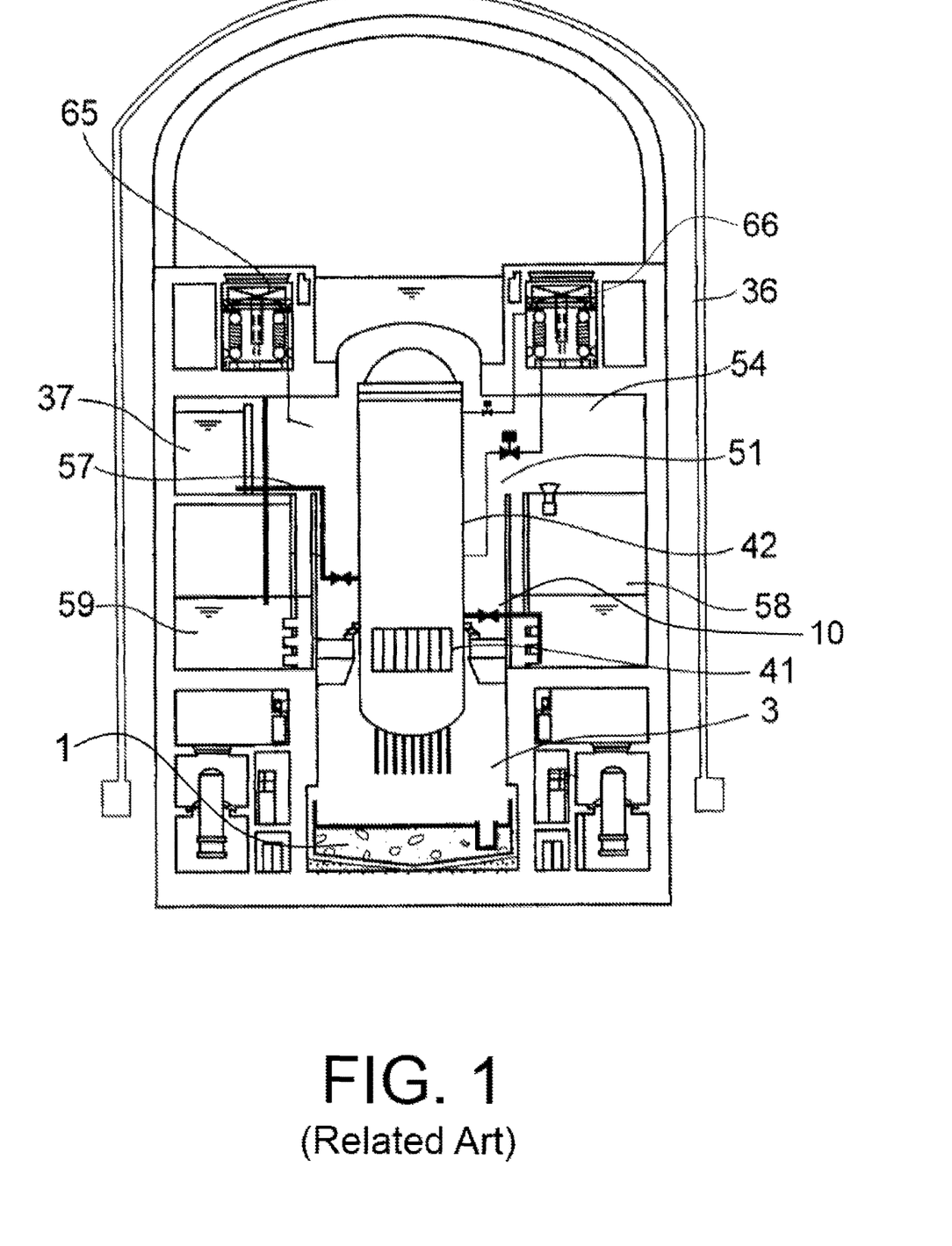
FIG. 1 is a schematic of a related art nuclear power containment and internals.

FIG. 1 is a schematic of a containment building 36 that houses a reactor pressure vessel 42 with various configurations of fuel 41 and reactor internals for producing nuclear power in a related art economic simplified boiling water reactor (ESBWR). Reactor 42 is conventionally capable of producing and approved to produce several thousand megawatts of thermal energy through nuclear fission. Reactor 42 sits in a drywell 51, including upper drywell 54 and a lower drywell 3 that provides space surrounding and under reactor 42 for external components and personnel. Reactor 42 is typically several dozen meters high, and containment building 36 even higher above ground elevation, to facilitate natural circulation cooling and construction from ground level. A sacrificial melt layer 1, called a basemat-internal melt arrest and coolability device, is positioned directly below reactor 42 to cool potential falling debris, melted reactor structures, and/or coolant and prevent their progression into a ground below containment 36.

Several different pools and flowpaths constitute an emergency core coolant system inside containment 36 to provide fluid coolant to reactor 42 in the case of a transient involving loss of cooling capacity in the plant. For example, containment 36 may include a pressure suppression chamber 58 surrounding reactor 42 in an annular or other fashion and holding suppression pool 59. Suppression pool 59 may include an emergency steam vent used to divert steam from a main steam line into suppression pool 59 for condensation and heat sinking, to prevent over-heating and over-pressurization of containment 36. Suppression pool 59 may also include flow paths that allow fluid flowing into drywell 54 to drain, or be pumped, into suppression pool 59. Suppression pool 59 may further include other heat-exchangers or drains configured to remove heat or pressure from containment 36 following a loss of coolant accident. An emergency core cooling system line and pump 10 may inject coolant from suppression pool 59 into reactor 42 to make up lost feedwater and/or other emergency coolant supply.

As shown in FIG. 1, a gravity-driven cooling system (GDCS) pool 37 can further provide coolant to reactor 42 via piping 57. A passive containment cooling system (PCCS) pool 65 may condense any steam inside containment 36, such as steam created through reactor depressurization to lower containment pressure or a main steam line break, and feed the condensed fluid back into GDCS pool 37. An isolation cooling system (ICS) pool 66 may take steam directly at pressure from reactor 42 and condense the same for recirculation back into rector 42. These safety systems may be used in any combination in various reactor designs, each to the effect of preventing overheating and damage of core 41, reactor 42 and all other structures within containment 36 by supplying necessary coolant, removing heat, and/or reducing pressure. Several additional systems are typically present inside containment 36, and several other auxiliary systems are used in related art ESBWR. Such ESBWRs are described in "The ESBWR Plant General Description" by GE Hitachi Nuclear Energy, Jun. 1, 2011, incorporated herein by refence in its entirety, hereinafter referred to as "ESBWR."

SUMMARY

Example embodiments include simplified nuclear reactors with an isolation condenser system connecting to the nuclear reactor through integrally isolatable connections that have a minimal risk of leakage or failure. In this way, example nuclear reactors may be effectively completely isolated from the isolation condenser system. Example embodiment isolation condenser systems include one or more isolation condensers immersed in a segregated coolant such that the condenser can transfer heat to the immersive coolant when receiving a working coolant or moderator from the nuclear reactor. The immersive coolant can be drawn from a separate coolant reservoir that supplies one or more separate isolation condensers. Barriers may prevent flow between the various isolation condensers; for example, a check valve may permit coolant to flow only from the reservoir to the isolation condenser and separate the two if the immersive coolant level becomes too high, too hot, too radioactive, etc. about the isolation condenser. A switch can passively monitor coolant level between the isolation condenser and reservoir, selectively permitting flow based on relative elevation of floats in the reservoir and coolant surrounding the isolation condenser. Movement of the floats may actuate the check valve and/or the isolation condenser itself. Isolation condensers in example systems can be activated by opening a fluid loop through the condenser to/from the reactor. For example, fluidic controls and/or a pressure pulse transmitter may monitor reactor conditions and selectively activate individual isolation condensers, trip and/or isolate the reactor, and/or trip the rest of the plant based on detected reactor pressures, coolant levels, etc. Such passive and reliable sensors may place the plant in a safe shutdown condition with indefinite cooling capacity if operations divert from design bases. Example embodiment isolation condenser systems may be positioned outside of containment in an underground silo with the containment, which may not have any other coolant source.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that conventional auxiliary or emergency coolant systems typically require powered, digital controls to activate and operate in nuclear reactors. Such emergency systems typically require pumps and/or active valves and monitors for proper operation. With several, diverse coolant systems, complex logic and controls may be required to achieve activation protocols and selectively activate individual safety systems. These systems are typically positioned inside containment for immediate reactor access, requiring a large and complex containment. To overcome these newly-recognized problems as well as others, the inventors have developed example embodiments and methods described below to address these and other problems recognized by the inventors with unique solutions enabled by example embodiments.

The present invention is isolation cooling systems, plants containing the same, and methods of operating such systems and plants. In contrast to the present invention, the few example embodiments and example methods discussed below illustrate just a subset of the variety of different configurations that can be used as and/or in connection with the present invention.

Figure 2:
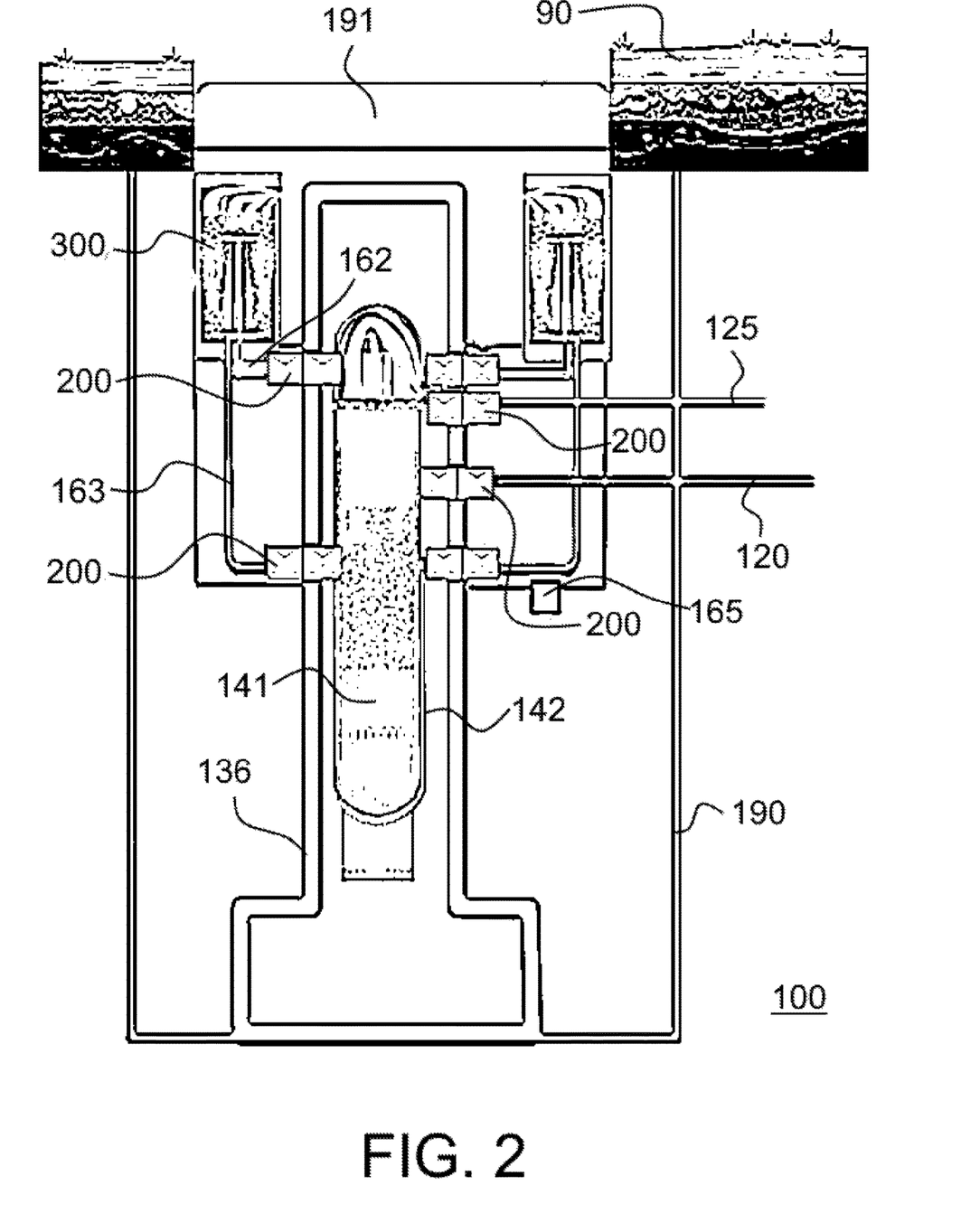
FIG. 2 is a schematic of an example embodiment very simplified boiling water nuclear reactor system.

FIG. 2 is a schematic of an example embodiment reactor system 100 including example embodiment reactor 142, example embodiment containment 136, and related cooling and power generation systems. System 100 is similarly described in co-owned application Ser. No. 15/585,162 to Hunt, Dahlgren, and Marquino, filed May 2, 2017 for VERY SIMPLIFIED BOILING WATER REACTORS FOR COMMERCIAL ELECTRICITY GENERATION and incorporated by reference herein in its entirety. Although not shown in FIG. 2, example embodiment system 100 is useable with conventional and known power generating equipment such as high- and low-pressure turbines, electrical generators, switchyards, condensers, cooling towers or heat sinks, etc., which may connect, for example to main feedwater line 120 and main steam line 125 in a similar fashion to any power generation facility. Example embodiment containment 136 is composed of resilient, impermeable material for limiting migration of radioactive material and plant components in the case of a transient or accident scenario. For example, containment 136 may be an integrally-formed concrete structure, potentially with reinforcing internal steel or rebar skeleton, several inches or feet thick. Or, for example, as discussed below, because containment 136 may be relatively smaller, an all-steel body may be used without being prohibitively expensive or complexly-fabricated, to enhance strength, radiation shielding, and lifespan of containment 136.

As shown in FIG. 2, example embodiment containment 136 may be underground, potentially housed in a reactor silo 190. A concrete lid 191 or other surface shield level with, or below, ground 90 may enclose silo 190 housing example embodiment reactor 142 and containment 136. Silo 190 and lid 191 may be seismically isolated or hardened to minimize any shock wave encountered from the ground and thus minimize impact of seismic events on reactor 142 and systems in silo 190 such as example ICS 300 and/or control system 165. If underground as shown in FIG. 2, example embodiment system 100 may present an exceedingly small strike target and/or be hardened against surface impacts and explosions. Further, if underground, example embodiment system 100 may have additional containment against radioactive release and enable easier flooding in the case of emergency cooling. Although not shown, any electricity-generating equipment may be connected above ground without loss of these benefits, and/or such equipment may also be placed below ground.

Based on the smaller size of example embodiment reactor 142 discussed below, example embodiment containment 136 may be compact and simplified relative to existing nuclear power plants, including the ESBWR. Conventional operating and emergency equipment, including a GDCS, PCCS, suppression pools, Bimacs, backup batteries, wetwells, torii, etc. may be wholly omitted from containment 136. Containment 136 may be accessible through fewer access points as well, such as a single top access point under shield 191 that permits access to reactor 142 for refueling and maintenance. The relatively small volume of example embodiment reactor 142 and core 141 may not require a bimac for floor arrest and cooling, because no realistic scenario exists for fuel relocation into containment 136; nonetheless, example embodiment containment 136 may have sufficient floor thickness and spread area to accommodate and cool any relocated core in its entirety, as shown in FIG. 2. Moreover, total penetrations through containment 136 may be minimized and or isolated to reduce or effectively eliminate risk of leakage from containment 136.

Example embodiment reactor 142 may be a boiling-water type reactor, similar to approved ESBWR designs in reactor internals and height. Reactor 142 may be smaller than, such as one-fifth the volume of, ESBWRs, producing only up to 600 megawatts of electricity for example, with a proportionally smaller core 141, for example operating at less than 1000 megawatt-thermal. For example, example embodiment reactor 142 may be almost 28 meters in height and slightly over 3 meters in diameter, with internals matching ESBWR internals but scaled down proportionally in the transverse direction to operate at approximately 900 megawatt-thermal and 300 megawatt-electric ratings. Or, for example, reactor 142 may be a same proportion as an ESBWR, with an approximate 3.9 height-to-width ratio, scaled down to a smaller volume. Of course, other dimensions are useable with example embodiment reactor 142, with smaller height-to-width ratios such as 2.7, or 2.0, that may enable natural circulation at smaller sizes or proper flow path configuration inside the reactor.

Keeping a relatively larger height of example embodiment reactor 142 may preserve natural circulation effects achieved by known ESBWRs in example embodiment reactor 142. Similarly, smaller reactor 142 may more easily be positioned underground with associated cooling equipment and/or possess less overheating and damage risk due to smaller fuel inventory in core 141. Even further, smaller example embodiment reactor 142 with lower power rating may more readily satisfy modular power or peaking power demands, with easier startup, shutdown, and/or reduced power operations to better match energy demand.

A coolant loop, such as main feedwater line 120 and main steam line 125, may flow into reactor 142 to provide moderator, coolant, and/or heat transfer fluid for electricity generation. An emergency coolant source, such as one or more example embodiment isolation condenser systems (ICS) 300, may further provide emergency cooling to reactor 142 in the instance of loss of feedwater from line 120. Example embodiment ICS 300 may include steam inlet 162 from example embodiment reactor 142 and condensate return 163 to reactor 142. Each of these connections to reactor 142 may use isolation valves 200 that are integrally connected to reactor 142 inside containment 136 and represent negligible failure risk.

Aside from valves 200, example embodiment containment 136 may be sealed about any other valve or penetration, such as power systems, instrumentation, coolant cleanup lines, etc. The fewer penetrations, smaller size, lack of systems inside, and/or underground placement of containment 136 may permit a higher operating pressure, potentially up to near reactor pressures of several hundred, such as 300, psig without any leakage potential.

As seen in example embodiment reactor system 100, several different features permit significantly decreased loss of coolant probability, enable responsive and flexible power generation, reduce plant footprint and above-ground strike target, and/or simplify nuclear plant construction and operation. Especially by using known and approved ESBWR design elements with smaller volumes and core sizes, example embodiment reactor 142 may still benefit from passive safety features such as natural circulation inherent in the ESBWR design, while allowing a significantly smaller and simplified example embodiment containment 136 and reliance on passive isolation condensers 166 for emergency heat removal.

Figure 3:
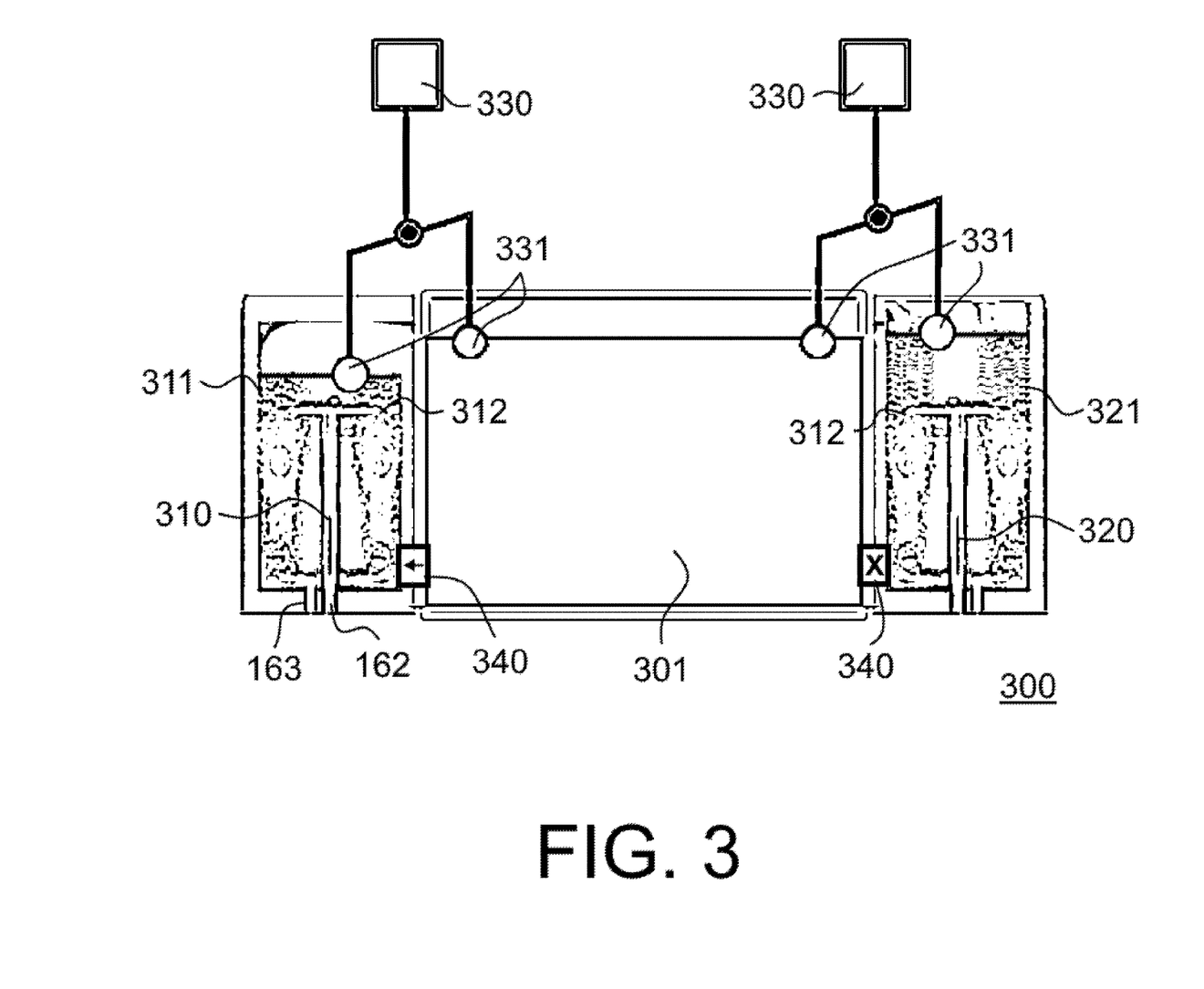
FIG. 3 is an illustration of an example embodiment ICS system useable in example embodiment reactor systems.

FIG. 3 is an illustration of an example embodiment ICS 300 useable in example embodiment plant 100. As shown in FIG. 3, example embodiment ICS 300 may include multiple isolation condensers 310, 320, etc. in fluid connection with a large reservoir or ICS pool 301. Although only a first isolation condenser 310 and a second isolation condenser 320 are shown in FIG. 3, it is understood that any number of isolation condenser(s) may feed from ICS pool 301. Each isolation condenser 310 and 320 may include its own ICS chambers 311 and 321 with independent coolant control and levels that may be replenished by ICS pool 301. Because ICS 300 may be outside of any containment, ICS pool 301, isolation condensers 310 and 320, and any other component of ICS 300 may be easily reached for maintenance, inspection, emergency refill, and/or operation, regardless of plant state.

As shown in FIG. 3, each isolation condenser 310 and 320 may be fed by steam inlet 162 providing steam produced in the nuclear reactor. The steam may pass down through heat exchanger 312 in isolation condenser 310 transferring heat to a fluid, such as water, in chamber 311 that condenses the steam back to liquid water. Condensate return line 163 then allows this condensed water to flow back into the reactor, driven by gravity, steam inertia, and density gradient between the steam and condensed water. Isolation condensers 310 and 320 may use a double, split loop through two, multi-channel heat exchangers 312 as shown in FIG. 3, or use other known designs, such as ICS designs from approved ESBWR plants or others.

If installed in an example embodiment plant system 100 (FIG. 2) using a lower-thermal-power reactor, such as in the lower hundreds-megawatt-thermal range, a single isolation condenser 310 may have cooling capacity for the entire reactor. That is, isolation condensers 310 and 320 may each be able to condense a full volume of steam produced by an example embodiment lower power reactor to maintain a steady liquid level in the same. Similarly, isolation condensers may have lower and/or varying capacities and be used in any number to provide a margin of safety, such as four total condensers each with a condensing capacity of 75% total core flow for a 3× safety margin.

Although each isolation condenser 310 and 320 is shown with its own steam line 162 and condensate return line 163, it is understood that actual supply and return may branch from a shared steam 162 and condensate return 163 line, so as to require only a single isolation valve 200 (FIG. 2) for all of ICS 300 having multiple isolation condensers 310, 320. Control of each isolation condenser may be individualized as discussed below through valves on steam line 162 and/or condensate return line 163. Or, first isolation condenser 310 and second isolation condenser 320 may each use an individual steam line 162 and condensate return line 163 with separate isolation valves 200, such as in the example of FIG. 2.

Because each isolation condenser 310 and 320 may use its own chamber 311 and 321, respectively, coolant levels may be maintained for each, despite drawing from a common pool 301. For example, check valves 340 between pool 301 and chamber 311 may permit only one-way flow from pool 301 into chamber 311. In this way, evaporation or boil-off from chamber 311 may be replenished from pool 301 without necessarily lowering or affecting levels in other chamber 321. Similarly, if chamber 311 is at a higher fill level, check valves 340 may not allow coolant to flow out into pool 301.

Passive switch 330 may detect when an ICS chamber should be isolated via check valve 340 or other connections to pool 301, without active or DCIS controls. Passive switch 330 may further indicate when an isolation condenser 311, 321, etc. should be deactivated. For example, passive switch 330 may use two floats, 331, one in pool 301 and another in ICS chamber 311. As floats move on the surface of the coolant, such as liquid water, they may move a position of switch 330 when joined on either side of a pivot. If coolant level in ICS chamber 311 is lower than pool 301, this may be reflected in positioning of floats 331, and switch 330 may open (shown by an arrow) check valve 340 between floats 331 and keep isolation condenser 310 active and ICS chamber 311 replenished. Or for example, as coolant level in ICS chamber 321 exceeds a level in pool 301, this may indicate malfunction or rupture in isolation condenser 320 where reactor coolant may be entering ICS chamber 321. Floats 331 in an opposite vertical relative positioning in this circumstance may close switch 330, which may close check valve 340 (shown by an X) and potentially deactivate or isolate isolation condenser 320 to prevent further reactor leakage and/or coolant flow into ICS chamber 321 and pool 301.

Although floats 331 are used by passive switch 330 in FIG. 3, it is understood that other passive or low-failure-mode devices can be used to detect abnormal or undesired conditions of isolation condensers and their chambers. For example, relative pressure detectors, radiation detectors, level-based coolant contact actuators, temperature monitors, etc. may all signal that an isolation condenser should be removed from service and/or cut-off from common coolant sources such as pool 301. Similarly, passive switch 330 or another detector may detect additional ICS cooling or condensation is necessary, such as if chamber 321 has approached boiling, and activate additional isolation condensers. Aside from check valves 340, additional isolating structures may be actuated upon detection of undesired operating conditions in example embodiment ICS 300, such as inoperable or leaking isolation condenser 320 requiring isolation of chamber 321. Additional modes of activating and deactivating isolation condensers 310 and 320 are discussed below in connection with FIG. 4.

Figure 4:
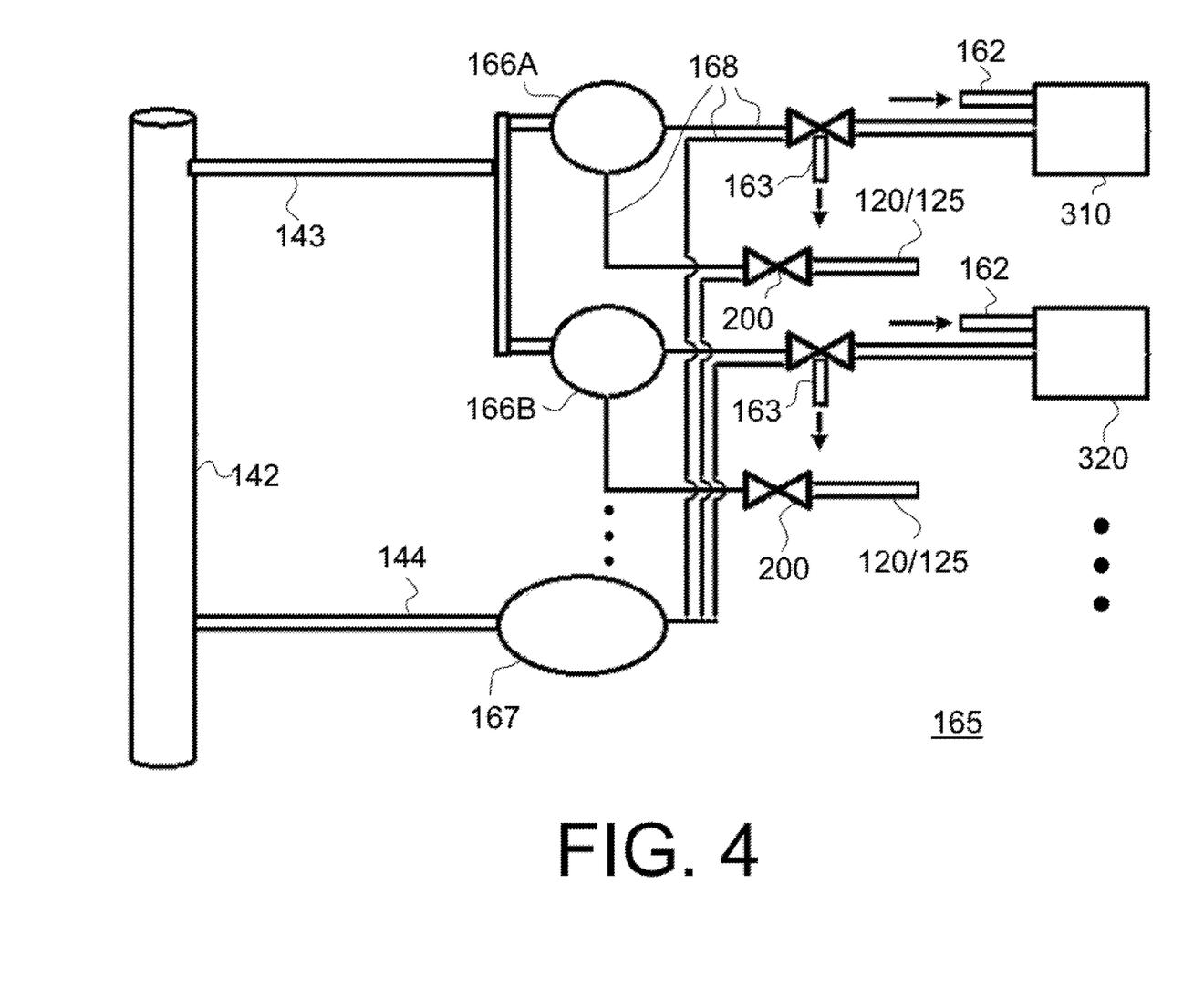
FIG. 4 is a schematic of an example embodiment selective activation and isolation system.

FIG. 4 is an illustration of an example embodiment selective activation and isolation system 165. As seen in FIG. 2, example embodiment system 165 may connect to or be interfaced with reactor 142, valves 200, ICS 300, and/or containment 136 to control operation of the same. As seen in FIG. 4, activation and isolation system 165 may include multiple fluidic controls 166A, 166B, etc. each interfaced with an isolation condenser 310, 320, etc. Although only two fluidic controls and two isolation condensers are shown in FIG. 4, it is understood that any number may be used. Fluidic controls 166A and 166B may connect to reactor 142 through a shared pressure line 143. Pressure line 143 may extend through containment with appropriate penetration seal or fluidic controls 166 may be inside containment.

At a pressure setpoint in pressure line 143, which reflects pressure in reactor 142, fluidic control 166A may activate isolation condenser 310. The pressure setpoint may be a high pressure associated with reactor overheat or isolation from feedwater or turbine loss, for example. Fluidic control 166A may be configured to directly actuate a valve, rupture an accumulator, passively use reactor pressure to open a valve, and/or otherwise reliably open a coolant loop to isolation condenser 310 at the setpoint. As shown in FIG. 4, the actuated valve may be a valve on the condensate return line 163; for example, the valve may be an isolation valve 200 (FIG. 2) connecting condensate return line 163 to reactor 142 or another valve dividing individual isolation condensers from such a line. Fluidic control 166A may further actuate a valve on steam inlet 162, or it is also possible that steam inlet 162 is always open to isolation condenser 310, such that opening only a single valve for condensate return 163 causes flow through isolation condenser 310, already at reactor pressure to prevent water hammer.

Another fluidic control 166B may open a valve associated with another isolation condenser 320 at the setpoint. Or, for example, fluidic control 166B may have a higher pressure activation setpoint, such that isolation condenser 320 is only activated if the setpoint for activation of fluidic control 166A for isolation condenser 310 has already been activated. For example, isolation condenser 310 may be leaking or not working, as determined by passive switch 330 (FIG. 3), which may re-close the valve opened by fluidic control 166A, deactivate fluidic control 166A, close another valve such as a steam inlet valve for condenser 310, or otherwise take isolation condenser 310 offline. If isolation condenser 310 is inadequate, inoperable, or deactivated, pressure in reactor 142 may rise again without any cooling or condensing system, particularly if reactor 142 (FIG. 2) is isolated by isolation valves 200 in the event of a transient. Eventually the pressure will rise to the higher setpoint of fluidic control 166B, which will activate isolation condenser 320 and provide pressure relief and cooling. This setup may be repeated for any number or independently-operable fluidic controls 166 at any number of different, desired pressure setpoints, to provide a throttled and redundant amount of heat removal and condensation to reactor 142.

As shown in FIG. 4, pressure pulse transmitter 167 is interfaced with reactor 142 through a reactor fluid line 144. Pressure pulse transmitter 167 may similarly activate one or all isolation condensers 310, 320, etc. Pressure pulse transmitter 167 may be a passive instrument that detects water level in reactor 142 and can, through hydraulic pressure, open and/or close any valve, including isolation valves 200, to activate isolation condenser 310 and/or 320, isolate reactor 142 from main steam line 125, isolate reactor 142 from main feedwater line 120, etc. Pressure pulse transmitter 167 may be of a type described in "Passive Pressure Pulse Transmitter" by Areva, incorporated herein by reference in its entirety, or another known type of pressure pulse transmitter.

Pressure pulse transmitter 167 may actuate valves based on water level in reactor 142 instead of pressure. As such, pressure pulse transmitter 167 may offer an alternative and independent metric of reactor functionality and safety on which to trigger safety functions. For example, pressure pulse transmitter 167 may detect an abnormal water level approaching a top of the reactor core or fuel, at which point all isolation condensers 310, 320, etc. may be activated by opening valves associated with the same. Or, for example, pressure pulse transmitter 167 may be configured with several water level setpoints to selectively activate or turn off systems, such as isolation condenser 310 at a first low reactor coolant level, isolation condenser 320 at a second lower reactor coolant level, etc. Still further, pressure pulse transmitter 167 may deactivate isolation condensers 310, 320, etc. or shut ICS valves on a condensate return line 163 or steam inlet 162 at detection of a high reactor coolant level.

As shown in FIG. 4, fluidic controls 166 and/or pressure pulse transmitter 167 in example embodiment selective activation and isolation system 165 may also interface with isolation valves 200 that isolate reactor 142 from main feedwater line 120 and/or main steam line 125, in addition to valves associated with isolation condensers 310, 320. Control connections 168 are used to illustrate operative control over the various valves controlling flow to isolation condensers, main steam, feedwater, etc.; it is understood that control connections may be contained in a single body with fluidic controls and manipulated valve or may be an actuator line or other powered connection that opens or closes the valve, for example. Similarly, fluidic controls 166 and/or pressure pulse transmitter 167 may use control logic to selectively open or close combinations of valves to place a plant in a desired configuration. For example, along with actuation of ICS 300, isolation valves 200 for main feedwater 120 and main steam outlet 125 may be closed to isolate reactor 142 by a single fluidic control 166A or transmitter 167. Or, different fluidic controls 166 may place the plant in differing configurations including triggering a reactor scram and/or main turbine trip, based on worsening detected pressure.

Example embodiments and methods thus being described, it will be appreciated by one skilled in the art that example embodiments may be varied and substituted through routine experimentation while still falling within the scope of the following claims. For example, a variety of different coolants and fuel types are compatible with example embodiments and methods simply through proper operating and fueling of example embodiments—and fall within the scope of the claims. Such variations are not to be regarded as departure from the scope of these claims.

What is claimed is:

1. An isolation condenser system for use in a nuclear reactor facility for commercially generating electricity, the system comprising:
    an inlet configured to provide reactor coolant from a nuclear reactor pressure vessel;
    an outlet configured to provide the reactor coolant to the nuclear reactor pressure vessel;
    at least one isolation condenser connected between the inlet and the outlet and immersed in a chamber filled with isolation condenser coolant, wherein the isolation condenser includes a heat exchanger configured to transfer energy from the reactor coolant to the isolation condenser coolant;
    a reservoir storing additional isolation condenser coolant for the chamber;
    a check valve allowing coolant flow from the reservoir to the chamber and preventing coolant flow from the chamber to the reservoir; and
    a switch configured to determine relative coolant level between the chamber and the reservoir and operate the check valve based on the relative coolant level.

2. The system of claim 1, wherein the switch is passive and includes a first float in the chamber and a second float in the reservoir, and wherein the switch is configured to close the check valve so as to isolate the chamber when the relative position of the first float is below the second float.

3. The system of claim 1, wherein the reservoir is a pool adjacent to the chamber and connected to the chamber so the isolation condenser coolant flows from the pool to the chamber.

4. The system of claim 1, wherein the reservoir is larger than the chamber.

5. The system of claim 1, wherein the entire system is underground.

6. An isolation condenser system for use in a nuclear reactor facility for commercially generating electricity, the system comprising:
    an inlet configured to provide reactor coolant from a nuclear reactor pressure vessel;
    an outlet configured to provide the reactor coolant to the nuclear reactor pressure vessel;
    at least one isolation condenser connected between the inlet and the outlet and immersed in a chamber filled with isolation condenser coolant, wherein the isolation condenser includes a heat exchanger configured to transfer energy from the reactor coolant to the isolation condenser coolant;
    a reservoir storing additional isolation condenser coolant selectively connected to the chamber so that the isolation condenser coolant can flow in only one direction from the reservoir to the chamber;
    a plurality of fluidic controls configured to activate the isolation condenser; and
    a plurality of the isolation condensers, and wherein each fluidic control is configured to activate one of the isolation condensers at a reactor pressure setpoint, wherein the reactor pressure setpoint is different for each one of the fluidic controls such that each one of the isolation condensers is activated at a different reactor pressure.

7. The system of claim 6, wherein the reservoir is a pool adjacent to the chamber and connected to the chamber so the isolation condenser coolant flows from the pool to the chamber.

8. The system of claim 6, wherein the reservoir is larger than the chamber.

9. The system of claim 6, wherein the entire system is underground.

* * * * *